United States Patent
Gupta et al.

(10) Patent No.: US 12,174,818 B2
(45) Date of Patent: Dec. 24, 2024

(54) SYSTEM AND METHOD FOR SAVING VIEW DATA USING GENERIC API

(71) Applicant: Rakuten Symphony, Inc., Tokyo (JP)

(72) Inventors: Rohit Gupta, Indore (IN); Yogesh Chouhan, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/912,964

(22) PCT Filed: Jul. 21, 2022

(86) PCT No.: PCT/US2022/037799
§ 371 (c)(1),
(2) Date: Sep. 20, 2022

(87) PCT Pub. No.: WO2024/019719
PCT Pub. Date: Jan. 25, 2024

(65) Prior Publication Data
US 2024/0248888 A1    Jul. 25, 2024

(51) Int. Cl.
*G06F 16/23*        (2019.01)
*G06F 9/54*         (2006.01)
(52) U.S. Cl.
CPC .............. *G06F 16/235* (2019.01); *G06F 9/54* (2013.01)
(58) Field of Classification Search
CPC .............. G06F 16/235; G06F 16/2393; G06F 16/2445; G06F 9/54
See application file for complete search history.

(56) References Cited

U.S. PATENT DOCUMENTS 7,469,248 B2 * 12/2008 Agrawal ............... G06F 16/256
8,601,000 B1 * 12/2013 Stefani ................. G06F 16/278
                                                          707/812
(Continued)

FOREIGN PATENT DOCUMENTS

CN        106708946 A  *  5/2017  ....... G06F 17/30339

OTHER PUBLICATIONS

International Search Report dated Nov. 25, 2022 issued by the International Searching Authority in Application No. PCT/US 22/37799.
(Continued)

*Primary Examiner* — Hares Jami
(74) *Attorney, Agent, or Firm* — Sughrue Mion, PLLC

(57) ABSTRACT

A system for storing input data to parameters included in a view using a generic save data API is provided. The system includes at least one processor configured to execute instructions to: make a save data API call for saving the input data to a plurality of tables, wherein an input of the save data API call comprises identifiers of the plurality of tables and the parameters, and the input data; obtain information of a second application from resource information pre-registered in the first application, the resource information mapping applications to tables respectively associated with the applications; send, based on the obtained information of the second application, a request to the second application to store first input data, from among the input data, to at least one table associated with the second application; and store, by the second application, the first input data to the at least one table.

20 Claims, 7 Drawing Sheets

(56) References Cited

U.S. PATENT DOCUMENTS

| | | | |
|---|---|---|---|
| 10,452,360 B1* | 10/2019 | Burman | G06F 9/453 |
| 11,250,012 B1* | 2/2022 | Gu | G06F 9/541 |
| 2005/0102685 A1* | 5/2005 | Hariharan | G06F 8/24 |
| | | | 719/328 |
| 2016/0041894 A1 | 2/2016 | Reid, III et al. | |

OTHER PUBLICATIONS

Written Opinion dated Nov. 25, 2022 issued by the International Searching Authority in Application No. PCT/US 22/37799.

* cited by examiner

FIG. 2

```
{
    "wrapperlist":[
        {
            "instanceOf":"Address",
            "stringJson":"
{\"latitudeDMSFormat\":{\"81°85\\\"\",\"longitudeDMSFormat\":{\"64°0'4
8\\\"\",\"latitudeDecimalFormat\":41.825159,\"longitudeDecimalFormat
\":-74.0135,\"siteAddressUpdate\":{\"No\",\"siteAddress\":\"New York,
N USA\",\"city\":{\"id\":495},\"zipCode\":\"23434\",\"county\":
{\"id\":85},\"state\":{\"id\":4},\"region\":{\"id\":3},\"country\":
{\"id\":3}}"
        },
        {
            "instanceOf":"StructureDetails",
            "stringJson":"
{\"groundElevation\":13,\"oranGroundElevation\":null,\"structureHeig
ht\":13,\"overAllHeight\":13,\"oranStructureHeight\":null,\"oranOver
AllHeight\":null,\"structureName\":\"NSB\",\"structureType\":\"Billb
oard\",\"leasedOrOwned\":\"Leased\",\"ownerName\":\"NSB\",\"ownerCon
tactNumber\":\"111-222-
3333\",\"ownerAddress\":\"NSB\",\"ownerCity\":
{\"id\":17332},\"ownerState\":
{\"id\":53},\"ownerZipcode\":\"354323\",\"topTipHeightEquipment\":11
,\"id\":307}"
        },
        {
            "instanceOf":"Comments",
            "stringJson":"{\"comment\":\"task updated
successfully\",\"id\":123}"
        }
    ],
    "entityRelation":{
        "PROJECT":"P081-575",
        "SITE":"SITE082",
        "PROJECTTASK":"P001-13",
        "TASKNAME":"Site Structure details"
    }
}
```

- 211A → 210A
- 211B → 210B
- 211C → 210C
- 220

SYSTEM AND METHOD FOR SAVING VIEW DATA USING GENERIC API

CROSS REFERENCE TO RELATED APPLICATIONS

This application is a National Stage of International Application No. PCT/US2022/037799 filed Jul. 21, 2022.

BACKGROUND

Databases may be used to store data for a variety of applications. For example, in business environments, databases may be used to store and manage job information, employee information, site information, and other related data for an application. The data may be input and/or viewed via different user interface views that store and/or fetch the data to/from the database tables.

A related art view building application may generate and configure different views for one or more other applications in an application platform (e.g., a cloud-based application platform for an enterprise or business). Each view corresponds to a screen, form, user interface, or page through which data may be input to respective fields (i.e., parameters) of the view and stored in one or more databases or tables of the one or more other applications, and/or data may be fetched from the one or more databases or tables and output for display on respective fields of the view. The related art view building application allows a user to generate or modify a view by configuring the fields to be included in the view, from among previously-registered fields corresponding to backend resource fields (e.g., database table columns) of the one or more other applications.

When a particular view is loaded for outputting data previously-stored (e.g., previously input) in one or more tables, the related art view building application must execute application programming interface (API) calls customized or written for that view. As a result, any change to the fields in the view requires changes in the APIs developed for the view to fetch resource data for the respective fields. In other words, if the view is modified to include one or more additional fields, then a custom API must be developed to fetch the resource data for the view.

Similarly, when a user wants to input data into a view (e.g., form), the view is displayed on a view user interface (UI) screen (e.g., a view UI of a corresponding application for which the view is created). The user can then manually input data into the respective fields of the displayed view, and save the view data into the backend table(s) that include columns corresponding to the respective view fields. This process can be repeated any number of times to create plural instances or records for a particular view. For example, where a task is to be performed multiple times on a particular process, a form (or view) may be filled out each time the task is performed and the corresponding input data may be stored in the backend table(s).

In the related art view UI, an API must be created for each backend table to which view data of that view will be saved, and integrated into the UI. For example, if a particular view includes view fields (i.e., parameters) linked to three different backend resources (i.e., database tables), then three different API calls must be integrated into the UI and executed. Further, if a view is modified to include an additional field, then an additional custom API must be written to save view data input to that field to its corresponding backend resource. This increases code complexity and results in multiple API creation and integration into a view. Further, any changes to views in the related art view building application are time consuming and inconvenient to a user, due to the additional API customization and development that is required.

SUMMARY

According to embodiments, systems and methods are provided for executing a generic save data API for saving input data for a view, where the save data API can be generically integrated into any view for saving respective input data into any number of backend tables, thereby eliminating the need for multiple creation and integration of APIs to save input data and for a particular view UI.

According to embodiments, a system for saving data input to parameters included in a view, includes: at least one memory storing instructions; and at least one processor configured to execute the instructions to: receive a user input of input data to parameters included in an output instance of a view; obtain, by a first application, view details for the view, wherein the view details include identifiers of the parameters included in the view and identifiers of a plurality of tables to which resource data of the parameters are to be respectively stored; make, by the first application, a save data application programming interface (API) call for saving the input data to the plurality of tables, wherein an input of the save data API call includes the identifiers of the plurality of tables, identifiers of the parameters, and the input data; obtain, based on the identifiers of the plurality of tables, information of a second application from resource information pre-registered in the first application, the resource information mapping applications to tables respectively associated with the applications; send, based on the obtained information of the second application, a request to the second application to store first input data, from among the input data, of at least one first parameter, from among the parameters, to at least one table associated with the second application, from among the plurality of tables; and store, by the second application, the first input data to the at least one table, wherein the save data API is generic across the plurality of tables.

The at least one processor may be further configured to execute the instructions to obtain identifiers of one or more primary keys corresponding to the view, wherein the input to the save data API may further include the identifiers of the one or more primary keys, and one or more primary key values corresponding to the instance of the view.

The at least one processor may be further configured to execute the instructions to: for each of the at least one table, search for an existing data object or record corresponding to a primary key value of the one or more primary key values; based on the existing data object or record being found in the search, update the existing data object or record with the first input data; and based on the existing data object or record not being found in the search, create a new data object or record with the first input data The input to the save data API may include a plurality of JavaScript Object Notation (JSON) strings in which the identifiers of the parameters and the input data are grouped per table of the plurality of tables, with each of the plurality of JSON strings respectively corresponding to a different table of the plurality of tables.

The view details may be obtained from a database that maps views to corresponding parameters respectively included in the views.

The plurality of tables may be associated with a plurality of applications, including the second application and a third application; and the at least one processor may be further configured to execute the instructions to: obtain, based on the identifiers of the plurality of tables, information of the second application and information of the third application, from the resource information pre-registered in the first application, and send, based on the obtained information of the second application, the request to the second application to store the first input data, and send, based on the obtained information of the third application, a request to the third application to store second input data, from among the input data, of at least one second parameter, from among the parameters, to at least one other table associated with the third application, from among the plurality of tables.

The at least one table associated with the second application may be plural tables; and the at least one processor may be further configured to execute the instructions to combine all input data corresponding to the plural tables associated with the second application into a single request and pass the request to an API of the second application.

According to embodiments, a method, performed by at least one processor, for saving data input to parameters included in a view, includes: receiving a user input of input data to parameters included in an output instance of a view; obtaining, by a first application, view details for the view, wherein the view details include identifiers of the parameters included in the view and identifiers of a plurality of tables to which resource data of the parameters are to be respectively stored; making, by the first application, a save data application programming interface (API) call for saving the input data to the plurality of tables, wherein an input of the save data API call includes the identifiers of the plurality of tables, identifiers of the parameters, and the input data; obtaining, based on the identifiers of the plurality of tables, information of a second application from resource information pre-registered in the first application, the resource information mapping applications to tables respectively associated with the applications; sending, based on the obtained information of the second application, a request to the second application to store first input data, from among the input data, of at least one first parameter, from among the parameters, to at least one table associated with the second application, from among the plurality of tables; and storing, by the second application, the first input data to the at least one table, wherein the save data API is generic across the plurality of tables.

The method may further include: obtaining identifiers of one or more primary keys corresponding to the view, wherein the input to the save data API may further include the identifiers of the one or more primary keys, and one or more primary key values corresponding to the instance of the view.

The storing the first input data to the at least one table may include: for each of the at least one table, searching for an existing data object or record corresponding to a primary key value of the one or more primary key values; based on the existing data object or record being found in the searching, updating the existing data object or record with the first input data; and based on the existing data object or record not being found in the searching, creating a new data object or record with the first input data.

The input to the save data API may include a plurality of JavaScript Object Notation (JSON) strings in which the identifiers of the parameters and the input data are grouped per table of the plurality of tables, with each of the plurality of JSON strings respectively corresponding to a different table of the plurality of tables.

The view details may be obtained from a database that maps views to corresponding parameters respectively included in the views.

The plurality of tables may be associated with a plurality of applications, including the second application and a third application; the obtaining may include obtaining, based on the identifiers of the plurality of tables, information of the second application and information of the third application, from the resource information pre-registered in the first application; and the sending may include sending, based on the obtained information of the second application, the request to the second application to store the first input data, and sending, based on the obtained information of the third application, a request to the third application to store second input data, from among the input data, of at least one second parameter, from among the parameters, to at least one other table associated with the third application, from among the plurality of tables.

The at least one table associated with the second application may be plural tables; and the sending the request to the second application to store the first input data may include combining all input data corresponding to the plural tables associated with the second application into a single request and passing the request to an API of the second application.

According to embodiments, a non-transitory computer-readable recording medium has recorded thereon instructions executable by at least one processor to perform a method for saving data input to parameters included in a view, the method including: receiving a user input of input data to parameters included in an output instance of a view; obtaining, by a first application, view details for the view, wherein the view details include identifiers of the parameters included in the view and identifiers of a plurality of tables to which resource data of the parameters are to be respectively stored; making, by the first application, a save data application programming interface (API) call for saving the input data to the plurality of tables, wherein an input of the save data API call includes the identifiers of the plurality of tables, identifiers of the parameters, and the input data; obtaining, based on the identifiers of the plurality of tables, information of a second application from resource information pre-registered in the first application, the resource information mapping applications to tables respectively associated with the applications; sending, based on the obtained information of the second application, a request to the second application to store first input data, from among the input data, of at least one first parameter, from among the parameters, to at least one table associated with the second application, from among the plurality of tables; and storing, by the second application, the first input data to the at least one table, wherein the save data API is generic across the plurality of tables.

The method may further include: obtaining identifiers of one or more primary keys corresponding to the view, wherein the input to the save data API may further include the identifiers of the one or more primary keys, and one or more primary key values corresponding to the instance of the view.

The storing the first input data to the at least one table may include: for each of the at least one table, searching for an existing data object or record corresponding to a primary key value of the one or more primary key values; based on the existing data object or record being found in the searching, updating the existing data object or record with the first input data; and based on the existing data object or record not being found in the searching, creating a new data object or record with the first input data.

The input to the save data API may include a plurality of JavaScript Object Notation (JSON) strings in which the identifiers of the parameters and the input data are grouped per table of the plurality of tables, with each of the plurality of JSON strings respectively corresponding to a different table of the plurality of tables.

The view details may be obtained from a database that maps views to corresponding parameters respectively included in the views.

The plurality of tables may be associated with a plurality of applications, including the second application and a third application; the obtaining may include obtaining, based on the identifiers of the plurality of tables, information of the second application and information of the third application, from the resource information pre-registered in the first application; and the sending may include sending, based on the obtained information of the second application, the request to the second application to store the first input data, and sending, based on the obtained information of the third application, a request to the third application to store second input data, from among the input data, of at least one second parameter, from among the parameters, to at least one other table associated with the third application, from among the plurality of tables.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 2 illustrates an example of an input to a save data API in accordance with an embodiment;

DETAILED DESCRIPTION

Figure 1:
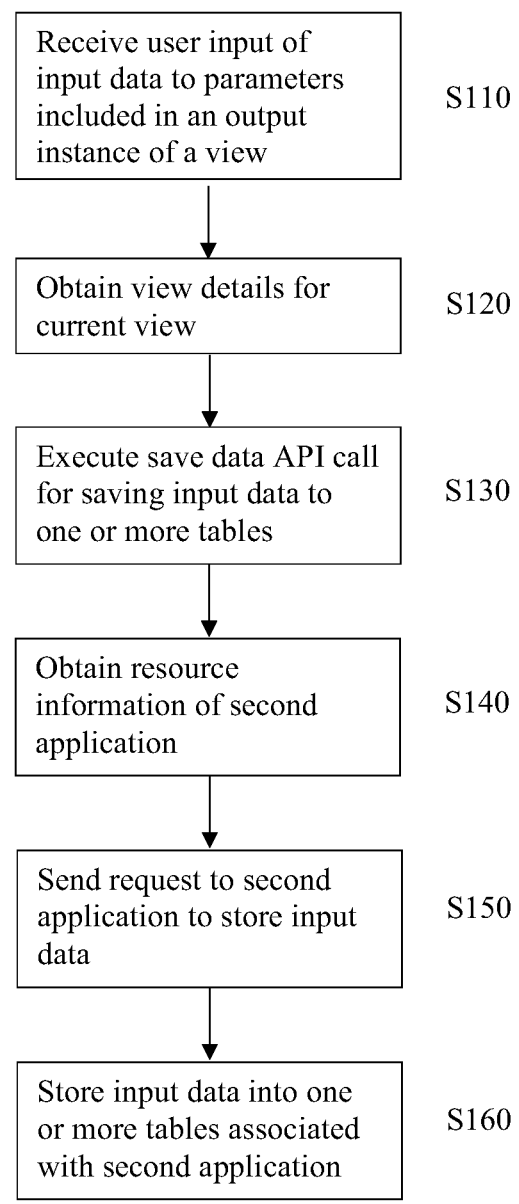
FIG. 1 illustrates a flowchart of a method for saving data input to parameters included in a view via a generic save data API, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which a generic save (or save data) application programming interface (API) is integrated into a data viewing application (e.g., the above-described related art view building application or view user interface (UI)) to save input data input to a view UI into one or more backend resources (e.g., columns of tables). As a result, the same generic save data API may be used to save data to any number of backend resources, for any of plural views and for any configuration or modification of a view, thereby eliminating the required development and attendant user inconvenience and time to configure views and mechanisms by which views store resource data.

Example embodiments of the present disclosure provide a method and system that executes a generic function to retrieve view details from a view configuration details table or database, and executes a generic save data API to save view data based on the retrieved view details. As a result, a same view may store view data into plural different resources and different views may be configured and the same view may be modified with different parameters (or data fields) without requiring multiple API creation and integration into views, thereby minimizing code complexity, development time, and user inconvenience.

FIG. 1 illustrates a flowchart of a method 100 for saving data input to parameters included in a view via a generic save data API, according to an embodiment. The method 100 of FIG. 1 may be performed by at least one processor executing instructions stored in at least one memory.

Referring to FIG. 1, at operation S110, a first application receives a user input of input data to parameters included in an output instance of a current view. The current view may be a view currently output by the first application. Each instance of the view may receive input data to update an existing record of input data corresponding to the view or to generate a new record corresponding to the view in one or more resources (e.g., backend database tables).

According to an embodiment, the first application (e.g., view building application) may be an application for configuring (e.g., building) and/or viewing different views for one or more other applications (e.g., one or more other applications integrated with or into the first application). Alternatively, the first application may be a view UI integrated into the one or more other applications (e.g., as a microservice). The one or more other applications may be applications installed and deployed in an application platform, such as a cloud-based application platform for an enterprise or business. The one or more other applications and/or the first application may be deployed as containerized or microservices-based applications.

Each view configured by the first application may correspond to a screen, form, user interface, or page through which data may be input to respective parameters (i.e., data fields such as Name, Gender, Age, Address, Equipment Information, etc.) of the view and stored in one or more databases or tables of (or associated with) the one or more other applications, and/or data may be fetched from the one or more databases or tables and output for display on respective parameters of the view. The first application allows a user to configure (e.g., generate or modify) a view by selecting the parameters to be included in the view, from among parameters previously registered in the first application and corresponding to backend resource fields (e.g., table columns) of the one or more other applications. For example, the previously-registered parameters may be listed or otherwise displayed for selection in a view configuration screen of the first application, and dragged and dropped onto a view being configured.

At operation S120, the first application obtains view details for the current view. The view details may be obtained from a database or table in which plural sets of view details are respectively mapped to corresponding view identifiers. In this case, the view details may be obtained based on a view identifier of the current view. The view details include identifiers of the parameters included in the view and identifiers of one or more tables in which the resource data of the parameters are respectively to be stored. The view details may also include primary key information (e.g., identifiers of one or more primary keys) corresponding to the current view. Here, the primary keys may vary from one application (i.e., application to which the view corresponds or to which a backend table for storing parameter data of the view corresponds) to another, or may vary from one backend table to another. The primary keys may correspond to parameters of the view (e.g., an input data field), to thereby distinguish records (or data objects) corresponding to the view from each other. For example, if a view is for inputting employee information, a primary key may be an employee ID field that is unique to each instance or employee record generated from/input to the view.

As will be set forth with reference to FIG. 3 below, the view details may be obtained by a generic API call (e.g., get data API call) in accordance with one or more embodiments. The API call may be executed by backend logic of the first application in response to a triggering event (e.g., loading the view, receiving a user request to save view data, etc.). The view details may be obtained in response to the instance of the view being loaded or output for display, or may be obtained in response to a request to save the input data of the view. It is understood that operation S120 may be performed prior to operation S110 or subsequent to operation S110.

At operation S130, the first application makes or executes a save data API call for saving the input data to one or more tables. According to an embodiment, the save data API is generic across a plurality of views, and across a plurality of tables. The same save data API may be called once to save input data into a plurality of corresponding backend tables. As a result, multiple API creation and integration and the attendant code complexity can be eliminated.

An input to the save data API call includes the identifiers of the one or more tables and the identifiers of the parameters, obtained from the view details. The input to the save data API further includes the input data. By way of example, the input to the save data API call may be include at least one JavaScript Object Notation (JSON) string. Further, the input may include a plurality of JSON strings, with each string corresponding to a respective table and containing the identifiers of the parameters associated with that table (e.g., associated with columns of that table, with each parameter having its data stored in a corresponding column) as well as the input data of the parameters associated with that table (i.e., the input data to be stored in that table).

The save data API may be executed in response to a user input to save the resource data. Alternatively (or additionally), the save data API may be automatically executed, e.g., when the view UI is closed or existed, periodically, etc.

At operation S140, the first application obtains, based on the identifiers of the one or more tables, resource information of at least a second application from resource information pre-registered in the first application. The resource information may include application information (e.g., at least one of application/microservice name, application/microservice path, etc.) of each application associated with or including a table(s) in which the parameters of the current view are stored.

Specifically, the first application obtains resource information corresponding to parameters and/or tables identified in the view detail information for a current view from a resource information storage (e.g., database(s), table(s), resource file(s), etc.). The resource information identifies the application(s) (e.g., second application) including or associated with the table(s) in which the parameters of the current view are stored. To this end, the resource information storage maps applications to tables respectively associated with the applications. Thus, a request by the first application for the resource information includes identification information of each table corresponding to the current view (i.e., each table including a parameter included in the current view). The identification information is obtained based on the view detail information for the current view. The request may be made by backend logic of the first application, e.g., via a backend API call.

As set forth above, one or more other applications may be integrated into the first application such that views may be built for the other applications and/or such that views may be configured with parameters for inputting and/or viewing resource data stored in association with the other applications (e.g., stored in tables of or associated with the other applications). The tables included in (or associated with) each of the integrated applications may be previously registered in the first application, such as by including mapping information of the tables to their locations in the resource information storage (e.g., resource information table). Here, the locations may be the respective applications in which the tables are stored (or with which the tables are associated). For example, the resource information may be application or microservice information including at least one of an application name, a microservice name, a microservice path, etc. Thus, the resource information may be application or microservice information obtained for each table included or identified in the view details for a particular view. An example of the resource information obtained from the resource information storage for a current view in which four tables (Table 1, Table 2, Table 3, and Table 4) are identified from the view details is provided in TABLE 1 below:

TABLE 1

| Table 1 | Microservice 1, path1 |
| Table 2 | Microservice 2, path2 |
| Table 3 | Microservice 3, path3 |
| Table 4 | Microservice 4, path4 |

In the present embodiment, operation S140 is performed in response to or based on the save data API call. It is understood, however, that one or more other embodiments are not limited thereto, and operation S140 may be performed prior to the save data API call, with the previously-obtained resource information of the relevant applications for the current view being later provided to execution logic of the save data API call.

Referring back to FIG. 1, in operation S150, a request is sent to at least the second application to store the input data (i.e., input data to view parameters for storage in resource tables associated with the second application) based on the obtained resource information (obtained in operation S140). That is, in response to the save data API call, a request is sent to each application associated with tables in which view data input to the current view is to be saved. The request is a save request to save corresponding input data to the respective tables. For example, referring to TABLE 1 above, where a current view has parameters corresponding to four tables of four different applications (or microservices), the resource information obtained in operation S140 is of the four applications, and four requests are sent to the four applications (one to each) to save corresponding input data. According to an embodiment, the four requests are sent based on the same generic save data API call. By way of example, each request may be passed or submitted to an API of or for each application associated with or including a table mapped to a parameter of the current view. For example, the API of each application may be a helper java code jar that contains a generic API and works as an intermediate between the first application and the other application for saving input data.

In operation S160, the second application (or each application that receives the request of operation S150) stores the input data to at least one table, based on the received request.

FIG. 2 illustrates an example of an input to a save data API in accordance with an embodiment. In the example of FIG. 2, the input to the save data API includes a list of JSON strings 211A, 211B, 211C, with each string corresponding to a different table.

In detail, execution logic of the first application generates an input by grouping the input data based on corresponding tables (or resources) to which the input data is to be stored. In FIG. 2, the current view includes parameters corresponding to three database tables: "Address," "StructureDetails," and "Comments." Thus, the input includes three objects 210A, 210B, 210C respectively corresponding to three tables. Each object includes a JSON string 211A, 211B, 211C in which the current view's parameters are provided with the values of the corresponding input data to those parameters. The parameters included in each JSON string 211A, 211B, 211C are those which belong to (i.e., have their data stored in) the respective table for that string. For example, the table "Comments" stores input data to the parameters "comment" and "id," as set forth in the corresponding string 211C.

The input to the save data API further includes an "entityRelation" object 220 in which primary keys and their values are set forth. The primary keys are used to uniquely identify the record for the current input data. That is, the primary keys are used to identify resource mapping to create and/or update resource data (i.e., the parameter data saved in the resources/tables). In an embodiment, each table may be understood as a table of rows and columns, with the columns corresponding to respective parameters, and each row providing a different record or object of data for those parameters. Thus, each row may correspond to a different record or instance of the view. The record is uniquely identified by a primary key value, e.g., a column may correspond to a primary key and the values in that column are unique to each row (such as a project number, a site identifier, a project task, and a task name).

As set forth above, the identifiers of the tables, parameters, and primary keys may be obtained by the execution logic of the first application from the view details of the current view. According to an embodiment, the view details may be obtained by executing a generic get data API.

Figure 3:
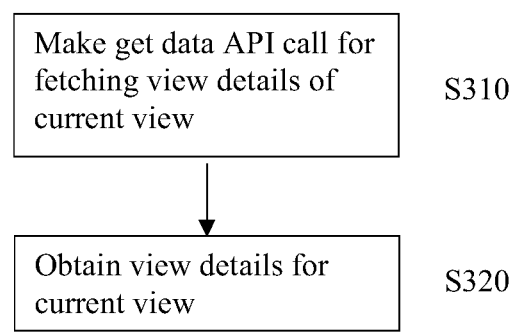
FIG. 3 illustrates a flowchart of a method of obtaining view details of a view, according to an embodiment.

FIG. 3 illustrates a flowchart of a method 300 of obtaining view details of a view, according to an embodiment. The method 300 of FIG. 3 may be performed by at least one processor executing instructions stored in at least one memory. For example, the method 300 of FIG. 3 may correspond to operation S120 of FIG. 1.

Referring to FIG. 3, at operation S310, an application (e.g., the first application described above) makes or executes a get data API call for fetching view details of parameters included in a view (i.e., current view). The current view may be a view that is currently output, and the get data API may be integrated into the first application (e.g., view UI). The get data API call may receive as an input at least a view identifier corresponding to the current view, though it is understood that other embodiments are not limited thereto. For example, the get data API call may also receive as an input an application identifier that identifies an application for which the view is configured. The input to and execution of the get data API call may be implemented by execution logic included the first application and executed in response to a user input requesting saving of input data to the current view and/or in response to a loading and outputting of the current view.

At operation S320, view details for the view are obtained in response to the get data API call. For example, the get data API call may request and receive view details from a database or table (e.g., JSON database or table), where said view details correspond to or are mapped to a view identifier. To this end, a view details storage (e.g., JSON database, table(s), resource file, etc.) may map views to corresponding parameters respectively included in the views as configured via a view building application. That is, based on a view being built or modified with various parameters in the view building application, the view building application stores those parameters in association with an identifier of the view (e.g., view name, index value, etc.) in the view details storage. Thus, based on the view identifier input to the get data API call, the corresponding view details for the current view are obtained from the view details storage.

According to an embodiment, the view details include identifiers of the parameters included in the current view. The view details may further include identifiers of one or more tables in which the parameters are respectively included, i.e., as columns (though it is understood that, in one or more other embodiments, the mapping of parameters to tables may be separately stored in a different table or storage and retrieved via separate logic). TABLE 2 below illustrates an example of view details mapped to a current view in the view details storage and obtained based on the get data API call:

TABLE 2

| Table 1 | Parameter 1, Parameter 2 |
| Table 2 | Parameter 3, Parameter 4 |
| Table 3 | Parameter 5, Parameter 6 |

As can be seen in the example of TABLE 2 above, the current view includes six parameters from three different tables. The view details are retrieved based on the generic get data API call to which the view name of the current view is input. Because the view details storage (e.g., database, table(s), resource file, etc.) stores the various parameters configured or included in each view, custom APIs for fetching view details for a particular view or modification of the view are not required. Instead, the generic get data API in accordance with example embodiments may be universally used to retrieve view details for each view from the view details storage. According to an embodiment, the view details may also identify at least one primary key for each Table.

For example, if the current view per the example of TABLE 2 is later modified to include an additional parameter from another table, e.g., Parameter 7 from Table 4 as shown in TABLE 3 below, then this update would be reflected in the view details for the current view as stored in the view details storage and would be retrieved by the generic get data API call without any API development or customizations:

TABLE 3

| Table 1 | Parameter 1, Parameter 2 |
| Table 2 | Parameter 3, Parameter 4 |
| Table 3 | Parameter 5, Parameter 6 |
| Table 4 | Parameter 7 |

The obtained view details may then be used to generate an input to a save data API according to example embodiments. The obtained view details may also be used to obtain resource information for applications associated with the tables identified in the view details. Alternatively, the save data API may obtain the resource information using the information (e.g., table identifiers) included in the input to the save data API.

Figure 4:
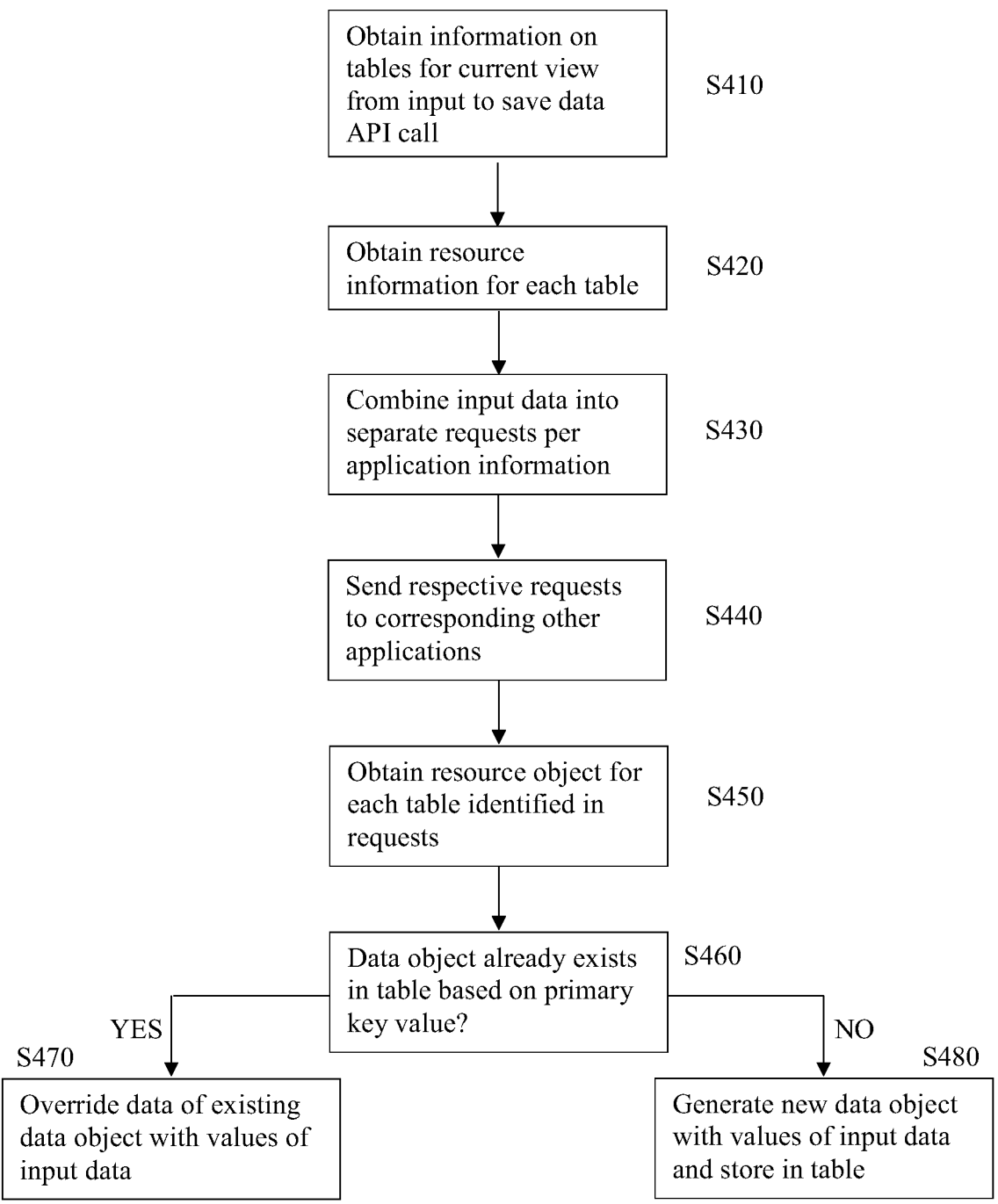
FIG. 4 illustrates a flowchart of a method of storing input data of a current view, according to an embodiment.

FIG. 4 illustrates a flowchart of a method 400 of storing view data of a view, according to an embodiment. The method 400 of FIG. 4 may be performed by at least one processor executing instructions stored in at least one memory. For example, the method 400 of FIG. 4 may correspond to operations S140 through S160 of FIG. 1.

Referring to FIG. 4, at operation S410, information on tables for a current view is obtained from the input to the save data API. In particular, identifiers of the tables included in the input to the save data API are obtained. For example, where the input is a JSON format (as exemplified in FIG. 2), the input is parsed into a plurality of objects each corresponding to a different table.

At operation S420, resource information (e.g., application/microservice name, path/URL, etc.) is obtained for each of the tables. According to an embodiment, the resource information is obtained from a resource information table, such as described above with reference to TABLE 1.

At operation S430, the input data that belongs to the same resource information (i.e., the same application or microservice path/URL) is combined. For example, where the resource information indicates that a first set of tables (among the tables identified in the input to the save data API) are associated with (or included in) a second application or microservice and that a second set of tables (among the tables identified in the input to the save data API) are associated with a third application or microservice, the first application (or the save data API) combines the input data, parameter identifiers, and/or table identifiers corresponding to the first set of tables into a first request, and combines the input data, parameter identifiers, and/or table identifiers corresponding to the second set of tables into a second request. Each request may have a JSON format similar to that of FIG. 2, and may include one or more primary keys relevant to that request (e.g., relevant to the microservice or tables of that request).

At operation S440, the respective requests are sent to the corresponding other applications or microservices. Taking the example described above, the first request may be submitted as an input to an API of the second application, and the second request may be submitted as an input to an API of the third application. All or some of operations S410 through S440 may be performed by execution logic of the save data API.

At operation S450, the other application or microservice processes the request to obtain a resource object for each table identified or included in the request. For example, where the request is in a JSON format (such as shown in FIG. 2), the JSON string for each table is parsed or converted to a JAVA object. In an embodiment, the API of the other application may create a JAVA resource (or table) object by casting the request input to a resource JAVA class.

At operation S460, a value of the primary key included in the resource object is checked against the corresponding table, to determine whether a data object (or record) already exists with that value.

If the data object already exists (Yes at S460), the data of that object is overridden with the values of the input data included in the resource object and stored in the table at operation S470. That is, the new inputs to the view override or replace the previous data or inputs for that record. By way of example, the existing data object is fetched from the table using a generic search method of that table (with the primary key value as an input). A JAVA reflection API may then be used to override the values (resource data) in the old data object with the new values included in the JSON string (i.e., in the resource object). The new data object is then passed to a service layer create method for the resource (table).

If the data object does not already exist (No at S460), then a new record or entry in the table is generated at operation S480, e.g., the input data in the resource object is saved in a new row of the table. In an example, a new data object with the input data is passed to a service layer create method of the table.

Operations S450 through S480 are performed by each of the other applications identified in the resource information of operation S420, e.g., the APIs of each of the other applications called in operation S440. Further, operations S460 through S480 are iterated or repeated for each resource object (table) included in the request (i.e., for which input data is to be stored by the other application). Based on completion of the storing, each of the other applications (e.g., APIs of the other applications/microservices) may return a response to the first application (or the save data API) indicating completion of the storage of the view input data. The save data API may combine the responses and confirm completion, and return a single response to the first application. The first application (e.g., view UI) may then output a message to a user confirming that the input data has been stored.

Figure 5:
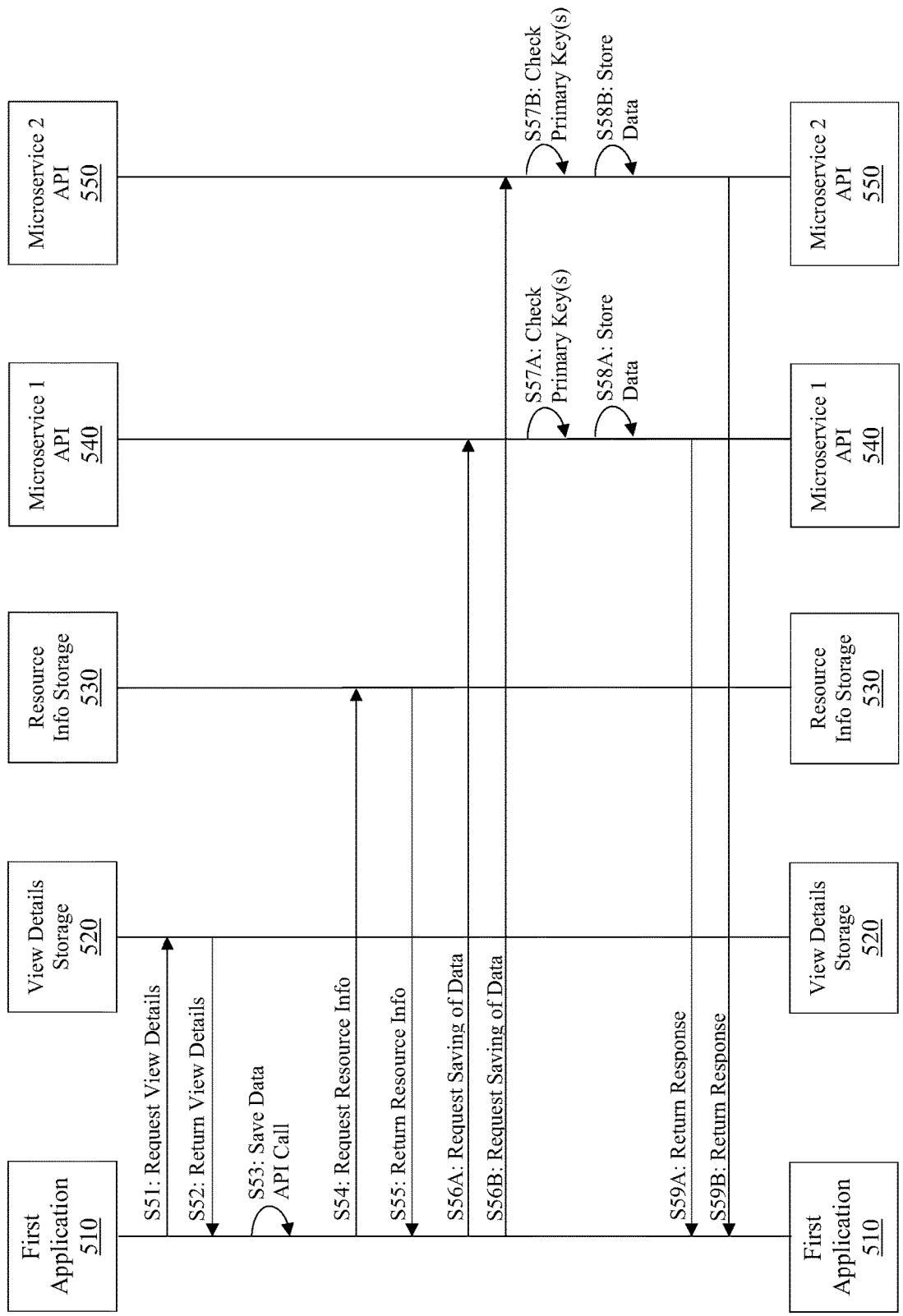
FIG. 5 illustrates a call flow diagram for storing input data of a current view according to an embodiment.

FIG. 5 illustrates a call flow diagram 500 for storing input data of a current view according to an embodiment. The operations shown in FIG. 5 may be performed by at least one processor executing instructions stored in at least one memory.

Referring to FIG. 5, at S51, a first application 510 (e.g., view builder or data viewing application or UI) requests view details for a current view from a view details storage 520. For example, the first application 510 may submit a request to a generic get data API according to example embodiments, for obtaining resource data of parameters included in a view (i.e., current view) configured by a view building application (which may be the first application). The request may include at least an identifier of the current view. The view details storage 520 may include a database, a table, a resource file, etc., in which views are mapped to corresponding view details respectively for the views. The view details include information on the parameters respectively included in the views, and may further include information on the tables in which those parameters are stored or included (e.g., as columns).

At S52, the view details for the current view are returned in response to the request. That is, based on the identifier of the current view included in the request, the corresponding view details may be read from the view details storage 520 and returned to the first application 510.

At S53, the first application makes a save data API call. An input to the save data API call may include the input data to view parameters (e.g., user input values to input fields presented on a view), identification information of the parameters of the view (obtained from the view details), and identification information of the tables corresponding to those parameters (obtained from the view details). The input data may be values input to the view via a text or character input, a drop down menu selection, a radio button selection, etc.

At S54, the save data API (which may be integrated into or with the first application) requests or queries resource information corresponding to the tables identified in the input to the save data API call, from a resource information storage 530 (e.g., database(s), table(s), resource file(s), etc.). The resource information identifies the application(s) including or associated with the tables in which the data input to the parameters of the current view are to be stored. To this end, the resource information storage 530 maps applications to tables (or parameters) respectively associated with the applications. Thus, the request includes identification information of each table (or each parameter) corresponding to a current view (i.e., each table including a parameter included in the current view). The identification information is obtained based on the view detail information for the current view. In another embodiment, the request may be made by backend logic of the first application 510, e.g., via a backend API call.

At S55, the resource information for the current view is returned to the first application 510 (or the save data API) in response to the request. For example, the resource information may be microservice information including at least one of a microservice name, a microservice path, etc. Thus, the resource information may be microservice information obtained for each table (or each parameter) included or identified in the view details for a particular view.

At S56A and S56B, the first application 310 (or save data API) sends requests to respective APIs 540 and 550 of each microservice included or identified in the resource information, in order to store corresponding input data (i.e., values to the parameters included in the current view) to the relevant tables (i.e., the tables in which parameter data of the current view are stored). Each request includes the relevant input data, parameter identification information, and primary key(s) information (e.g., identification information and value).

At S57A and S57B, each microservice API 540, 550 checks the primary key value for each table to determine whether to update an existing data object or record, or create a new data object or record.

At S58A and S58B, the input data is stored in the corresponding table (as an update or override or as a new entry) by the microservice APIs 540, 550.

At S59A and S59B, each of the microservice APIs 540, 550 returns a response informing or confirming completion of the storage.

Figure 6:
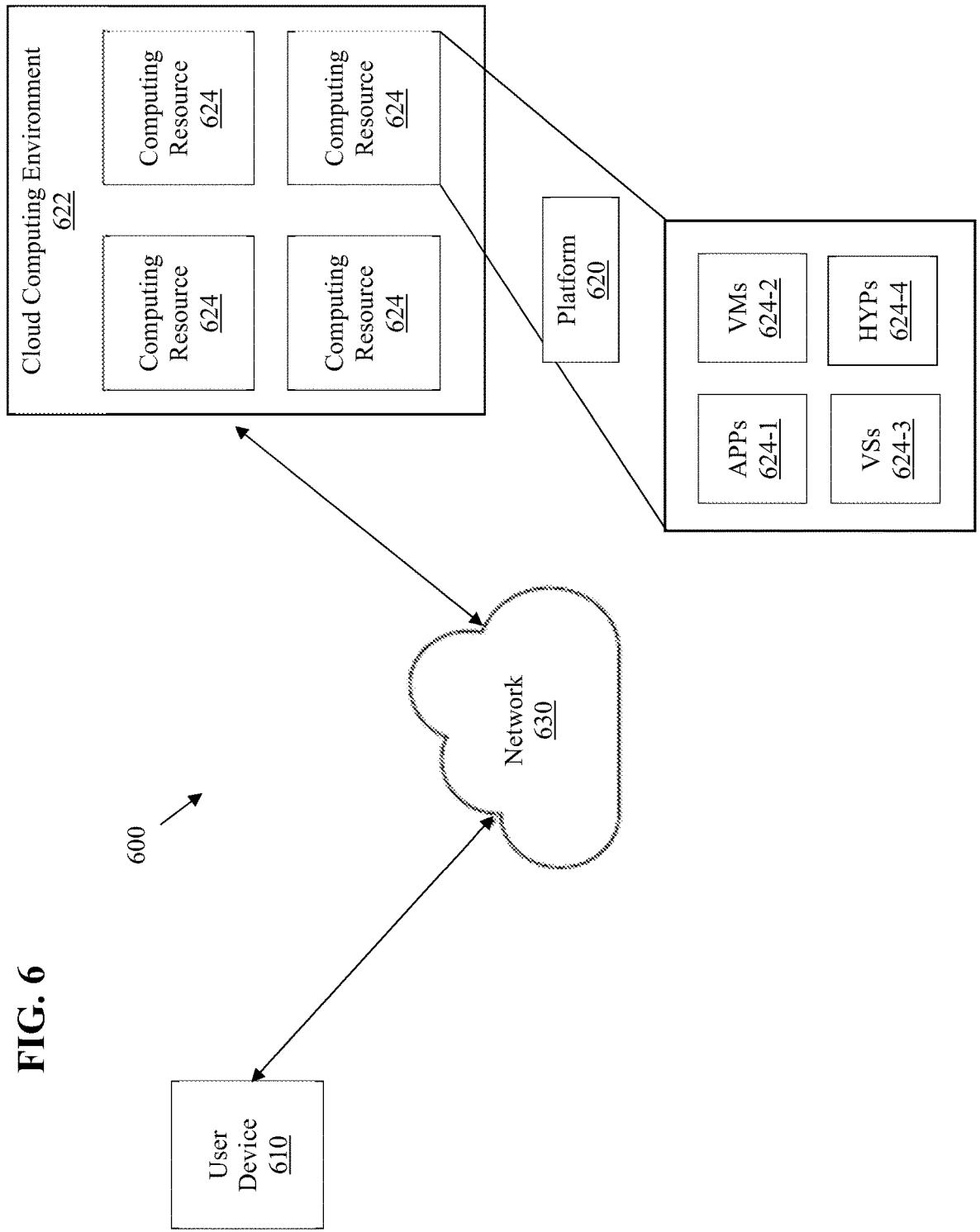
FIG. 6 is a diagram of an example environment in which systems and/or methods, described herein, may be implemented.

FIG. 6 is a diagram of an example environment 600 in which systems and/or methods, described herein, may be implemented. As shown in FIG. 6, environment 600 may include a user device 610, a platform 620, and a network 630. Devices of environment 600 may interconnect via wired connections, wireless connections, or a combination of wired and wireless connections. In embodiments, any of the functions and operations described with reference to FIGS. 1 through 5 above may be performed by any combination of elements illustrated in FIG. 6.

User device 610 includes one or more devices capable of receiving, generating, storing, processing, and/or providing information associated with platform 620. For example, user device 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 610 may receive information from and/or transmit information to platform 620.

Platform 620 includes one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 may not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc., services that do not require end-user (e.g., user device 610) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by user device 610. Application 624-1 may eliminate a need to install and execute the software applications on user device 610. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 610), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
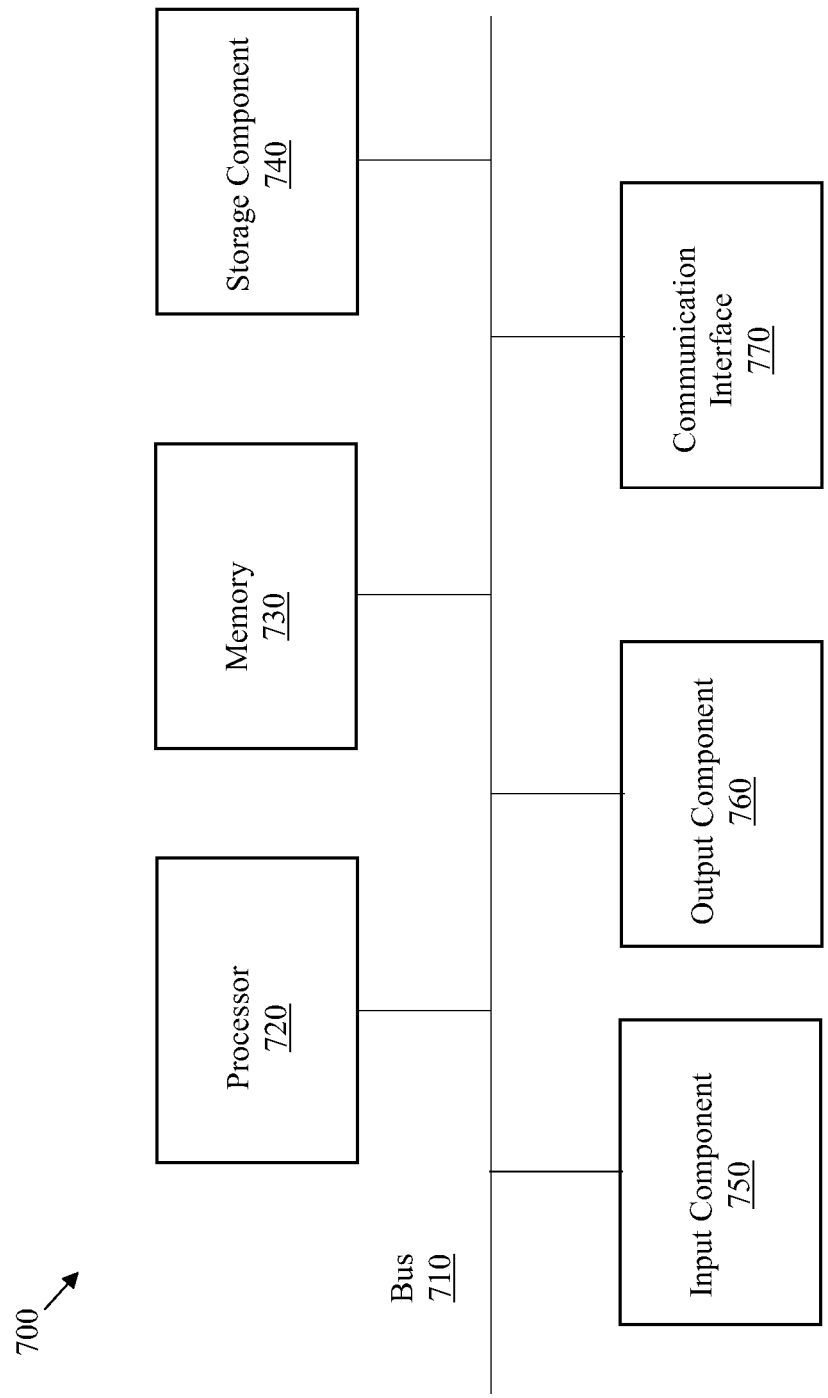
FIG. 7 is a diagram of example components of a device according to an embodiment.

FIG. 7 is a diagram of example components of a device 700. Device 700 may correspond to user device 610 and/or platform 620. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

In embodiments, any one of the operations or processes of FIGS. 1 through 5 may be implemented by or using any one of the elements illustrated in FIGS. 6 and 7.

In accordance with example embodiments, a generic save data API is integrated into a view UI to store input data to parameters of the UI to corresponding resources (e.g., tables). As a result, the same generic save data API may be used to save data to any number of backend resources, for any of plural views and for any configuration or modification of a view, thereby eliminating the required development and attendant user inconvenience and time to configure views and mechanisms by which views fetch and display resource data.

Further, in accordance with example embodiments, a data viewing application may execute a generic function to retrieve view details from a view configuration details table or database, and executes a generic save data API to save view data based on the retrieved view details. As a result, a same view may store view data into plural different resources and different views may be configured and the same view may be modified with different parameters (or data fields) without requiring multiple API creation and integration into views, thereby minimizing code complexity, development time, and user inconvenience.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for saving data input to parameters included in a view, the system comprising:
    at least one memory storing instructions; and
    at least one processor configured to execute the instructions to:
        receive a user input of input data to parameters included in an output instance of a view;
        obtain, by a first application, view details for the view, wherein the view details comprise identifiers of the parameters included in the view and identifiers of a plurality of tables to which resource data of the parameters are to be respectively stored;
        make, by the first application, a save data application programming interface (API) call for saving the input data to the plurality of tables, wherein an input of the save data API call comprises the identifiers of the plurality of tables, the identifiers of the parameters, and the input data;
        obtain, based on the identifiers of the plurality of tables, information of a second application from resource information pre-registered in the first application, the resource information mapping applications to tables respectively associated with the applications;
        send, based on the obtained information of the second application, a request to the second application to store first input data, from among the input data, of at least one first parameter, from among the parameters, to at least one table associated with the second application, from among the plurality of tables; and
        store, by the second application, the first input data to the at least one table, wherein the save data API is generic across the plurality of tables.

2. The system as claimed in claim 1, wherein:
    the at least one processor is further configured to execute the instructions to obtain identifiers of one or more primary keys corresponding to the view,
    wherein the input to the save data API further comprises the identifiers of the one or more primary keys, and one or more primary key values corresponding to the instance of the view.

3. The system as claimed in claim 2, wherein the at least one processor is further configured to execute the instructions to:
    for each of the at least one table, search for an existing data object or record corresponding to a primary key value of the one or more primary key values;
    based on the existing data object or record being found in the search, update the existing data object or record with the first input data; and based on the existing data object or record not being found in the search, create a new data object or record with the first input data.

4. The system as claimed in claim 1, wherein the input to the save data API comprises a plurality of JavaScript Object Notation (JSON) strings in which the identifiers of the parameters and the input data are grouped per table of the plurality of tables, with each of the plurality of JSON strings respectively corresponding to a different table of the plurality of tables.

5. The system as claimed in claim 1, wherein the view details are obtained from a database that maps views to corresponding parameters respectively included in the views.

6. The system as claimed in claim 1, wherein:
the plurality of tables are associated with a plurality of applications, including the second application and a third application; and
the at least one processor is further configured to execute the instructions to:
obtain, based on the identifiers of the plurality of tables, information of the second application and information of the third application, from the resource information pre-registered in the first application, and
send, based on the obtained information of the second application, the request to the second application to store the first input data, and send, based on the obtained information of the third application, a request to the third application to store second input data, from among the input data, of at least one second parameter, from among the parameters, to at least one other table associated with the third application, from among the plurality of tables.

7. The system as claimed in claim 1, wherein:
the at least one table associated with the second application is plural tables; and
the at least one processor is further configured to execute the instructions to combine all input data corresponding to the plural tables associated with the second application into a single request and pass the request to an API of the second application.

8. A method, performed by at least one processor, for saving data input to parameters included in a view, the method comprising:
receiving a user input of input data to parameters included in an output instance of a view;
obtaining, by a first application, view details for the view, wherein the view details comprise identifiers of the parameters included in the view and identifiers of a plurality of tables to which resource data of the parameters are to be respectively stored;
making, by the first application, a save data application programming interface (API) call for saving the input data to the plurality of tables, wherein an input of the save data API call comprises the identifiers of the plurality of tables, the identifiers of the parameters, and the input data;
obtaining, based on the identifiers of the plurality of tables, information of a second application from resource information pre-registered in the first application, the resource information mapping applications to tables respectively associated with the applications;
sending, based on the obtained information of the second application, a request to the second application to store first input data, from among the input data, of at least one first parameter, from among the parameters, to at least one table associated with the second application, from among the plurality of tables; and
storing, by the second application, the first input data to the at least one table,
wherein the save data API is generic across the plurality of tables.

9. The method as claimed in claim 8, further comprising:
obtaining identifiers of one or more primary keys corresponding to the view,
wherein the input to the save data API further comprises the identifiers of the one or more primary keys, and one or more primary key values corresponding to the instance of the view.

10. The method as claimed in claim 9, wherein the storing the first input data to the at least one table comprises:
for each of the at least one table, searching for an existing data object or record corresponding to a primary key value of the one or more primary key values;
based on the existing data object or record being found in the searching, updating the existing data object or record with the first input data; and
based on the existing data object or record not being found in the searching, creating a new data object or record with the first input data.

11. The method as claimed in claim 8, wherein the input to the save data API comprises a plurality of JSON strings in which the identifiers of the parameters and the input data are grouped per table of the plurality of tables, with each of the plurality of JSON strings respectively corresponding to a different table of the plurality of tables.

12. The method as claimed in claim 8, wherein the view details are obtained from a database that maps views to corresponding parameters respectively included in the views.

13. The method as claimed in claim 8, wherein:
the plurality of tables are associated with a plurality of applications, including the second application and a third application;
the obtaining comprises obtaining, based on the identifiers of the plurality of tables, information of the second application and information of the third application, from the resource information pre-registered in the first application; and
the sending comprises sending, based on the obtained information of the second application, the request to the second application to store the first input data, and sending, based on the obtained information of the third application, a request to the third application to store second input data, from among the input data, of at least one second parameter, from among the parameters, to at least one other table associated with the third application, from among the plurality of tables.

14. The method as claimed in claim 8, wherein:
the at least one table associated with the second application is plural tables; and
the sending the request to the second application to store the first input data comprises combining all input data corresponding to the plural tables associated with the second application into a single request and passing the request to an API of the second application.

15. A non-transitory computer-readable recording medium having recorded thereon instructions executable by at least one processor to perform a method for saving data input to parameters included in a view, the method comprising:
receiving a user input of input data to parameters included in an output instance of a view;

obtaining, by a first application, view details for the view, wherein the view details comprise identifiers of the parameters included in the view and identifiers of a plurality of tables to which resource data of the parameters are to be respectively stored;

making, by the first application, a save data application programming interface (API) call for saving the input data to the plurality of tables, wherein an input of the save data API call comprises the identifiers of the plurality of tables, the identifiers of the parameters, and the input data;

obtaining, based on the identifiers of the plurality of tables, information of a second application from resource information pre-registered in the first application, the resource information mapping applications to tables respectively associated with the applications;

sending, based on the obtained information of the second application, a request to the second application to store first input data, from among the input data, of at least one first parameter, from among the parameters, to at least one table associated with the second application, from among the plurality of tables; and storing, by the second application, the first input data to the at least one table, wherein the save data API is generic across the plurality of tables.

16. The non-transitory computer-readable recording medium as claimed in claim 15, wherein the method further comprises:

obtaining identifiers of one or more primary keys corresponding to the view, wherein the input to the save data API further comprises the identifiers of the one or more primary keys, and one or more primary key values corresponding to the instance of the view.

17. The non-transitory computer-readable recording medium as claimed in claim 16, wherein the storing the first input data to the at least one table comprises:

for each of the at least one table, searching for an existing data object or record corresponding to a primary key value of the one or more primary key values;

based on the existing data object or record being found in the searching, updating the existing data object or record with the first input data; and based on the existing data object or record not being found in the searching, creating a new data object or record with the first input data.

18. The non-transitory computer-readable recording medium as claimed in claim 15, wherein the input to the save data API comprises a plurality of JSON strings in which the identifiers of the parameters and the input data are grouped per table of the plurality of tables, with each of the plurality of JSON strings respectively corresponding to a different table of the plurality of tables.

19. The non-transitory computer-readable recording medium as claimed in claim 15, wherein the view details are obtained from a database that maps views to corresponding parameters respectively included in the views.

20. The non-transitory computer-readable recording medium as claimed in claim 15, wherein:

the plurality of tables are associated with a plurality of applications, including the second application and a third application;

the obtaining comprises obtaining, based on the identifiers of the plurality of tables, information of the second application and information of the third application, from the resource information pre-registered in the first application; and the sending comprises sending, based on the obtained information of the second application, the request to the second application to store the first input data, and sending, based on the obtained information of the third application, a request to the third application to store second input data, from among the input data, of at least one second parameter, from among the parameters, to at least one other table associated with the third application, from among the plurality of tables.

* * * * *